US012671296B2

(12) United States Patent

He et al.

(10) Patent No.: US 12,671,296 B2

(45) Date of Patent: Jun. 30, 2026

(54) ELECTRIC MOTOR STATOR VARNISH OPTIMIZATION

(71) Applicant: GM GLOBAL TECHNOLOGY OPERATIONS LLC, Detroit, MI (US)

(72) Inventors: Song He, Troy, MI (US); John M. Lorentz, Plymouth, MI (US); Edward L. Kaiser, Orion, MI (US); Ronald Buchholz, Casco, MI (US); Valerie Wu, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 301 days.

(21) Appl. No.: 18/437,840

(22) Filed: Feb. 9, 2024

(65) Prior Publication Data

US 2025/0260291 A1 Aug. 14, 2025

(51) Int. Cl.

| | |
|---|---|
| *H02K 5/24* | (2006.01) |
| *H02K 3/34* | (2006.01) |
| *H02K 9/19* | (2006.01) |
| *H02K 21/14* | (2006.01) |

(52) U.S. Cl.
CPC .............. *H02K 5/24* (2013.01); *H02K 3/345* (2013.01); *H02K 9/19* (2013.01); *H02K 21/14* (2013.01)

(58) Field of Classification Search
CPC ........ H02K 1/165; H02K 21/14; H02K 3/345; H02K 3/487; H02K 5/24; H02K 9/19
See application file for complete search history.

(56) References Cited

U.S. PATENT DOCUMENTS

| | | | |
|---|---|---|---|
| 6,499,209 | B1 | 12/2002 | Landin et al. |
| 10,658,884 | B2 * | 5/2020 | Honjo ...................... H02K 1/04 |
| 2011/0181146 | A1 | 7/2011 | Asano et al. |
| 2023/0009899 | A1 * | 1/2023 | Noto ........................ H02K 1/16 |
| 2023/0054794 | A1 * | 2/2023 | Fatemi ................... H02K 3/345 |

FOREIGN PATENT DOCUMENTS

| | | |
|---|---|---|
| DE | 102022111954 A1 | 2/2023 |
| JP | 202028153 A | 9/2021 |

OTHER PUBLICATIONS

Seite "Backlackspule" In: Wikipedia, Bearbeitungsstand: 08303. 2020, 12:13 UTC. URL: https://de.wikipedia.org/w/index.php?title= Backlackspule&oldid=1975627120 (Abgerufen: Nov. 15, 2024, 17:19 UTC).

* cited by examiner

*Primary Examiner* — Naishadh N Desai

(74) *Attorney, Agent, or Firm* — Quinn IP Law

(57) ABSTRACT

An electric motor includes a stator having a stator core constructed from a ferromagnetic material and having an external stator surface. The stator core includes a stator core body and a plurality of stator teeth extending therefrom. The plurality of stator teeth define conductor slots therebetween. The stator also includes a plurality of stator conductors arranged within the conductor slots. The stator additionally includes a slot liner arranged within each conductor slot and surrounding the corresponding stator conductors. A first gap is established between each stator conductor and the corresponding slot liner, and a second gap is established between each slot liner and the neighboring stator teeth. A predetermined amount of varnish arranged within the first and second gaps to limit an amount of open space within the first and second gaps that is free from the varnish and regulate viscous damping of the electric motor.

18 Claims, 5 Drawing Sheets

ELECTRIC MOTOR STATOR VARNISH OPTIMIZATION

INTRODUCTION

The disclosure relates to optimization of varnish application in a stator of an electric motor.

An electric motor is a machine that converts electric energy into mechanical energy. Electric motors may be configured as an alternating current (AC) or a direct current (DC) type. An electric motor's operation is based on an electromagnetic interaction between permanent magnets and the magnetic field created by the machine's selectively energized coils. Electric motors are classified into two categories based on the direction of the magnetic field-axial flux motors and radial flux motors. Generally, axial flux motors include rotors internal to the corresponding stators, while radial flux motors include rotors positioned alongside the stators.

As a byproduct of generated torque, electric motors produce thermal energy which may adversely affect motor performance and reliability. Cooling of an electric motor may therefore remove thermal stress seen by motor poles or windings and provide longer motor life under or close to peak load. Cooling of an electric motor may also enhance motor operation at higher speeds, as well as facilitate reduced motor inertia and packaging. Motor cooling is generally provided by a circulating oil, which may be also used to reduce friction between internal motor components.

SUMMARY

An electric motor includes a stator having a stator core constructed from a ferromagnetic material and having an external stator surface. The stator core includes a stator core body and a plurality of stator teeth extending therefrom. The plurality of stator teeth define conductor slots therebetween. The stator also includes a plurality of stator conductors arranged within the conductor slots. The stator additionally includes a slot liner arranged within each conductor slot and surrounding the corresponding stator conductors. A first gap is established between each stator conductor and the corresponding slot liner, and a second gap is established between each slot liner and the neighboring stator teeth. A predetermined amount of varnish arranged within each of the first gap and the second gap and thereby configured to limit an amount of open space within the first and second gaps that is free from the varnish. Thus arranged, the subject amount of varnish regulates viscous damping and noise, vibration, and harshness (NVH) characteristics of the electric motor.

The electric motor may additionally include a lubrication system configured to supply oil to the stator. A portion of the oil may fill the open space free from the varnish within the first and second gaps during operation of the electric motor to thereby affect noise, vibration, and harshness (NVH) characteristics of the electric motor.

The varnish may fill up to 80% of each of the first and second gaps.

The varnish may be arranged away from relatively high vibration or resonance angular positions.

The varnish arranged away from the relatively high vibration angular positions may fill greater than 90% of each of the first and second gaps.

The varnish arranged proximate the relatively high vibration angular positions may fill 50% of each of the first and second gaps.

In a side view, the stator core may include a plurality of adjacent stator laminations arranged along the rotational axis. The amount of varnish may be varied axially, i.e., along the rotational axis.

In a plan view, the stator core may include a plurality of circumferentially arranged mounting bosses defining motor constraint locations. The relatively high vibration angular positions may be disposed between the mounting bosses, and the predetermined amount of varnish may be applied within the first and second gaps between the mounting bosses.

In a side view, the stator core may include a first stator end and an opposite second stator end. The mounting bosses may be arranged on the first stator end, and the varnish may fill greater than 90% of each of the first and second gaps axially proximate the mounting bosses.

The stator may include a stator inside diameter (ID) and a stator outside diameter (OD), and the amount of varnish may be varied in a radial direction between the stator ID and the stator OD.

Each slot liner may include a first slot liner section and a second slot liner section. In such an embodiment, the first slot liner section may be configured to wrap partially around the corresponding stator conductors and the second slot liner section may be configured to wrap partially around the subject stator conductors and overlap the first slot liner section.

The electric motor may have either a radial or an axial flux construction,

A motor vehicle having such an electric motor as described above is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
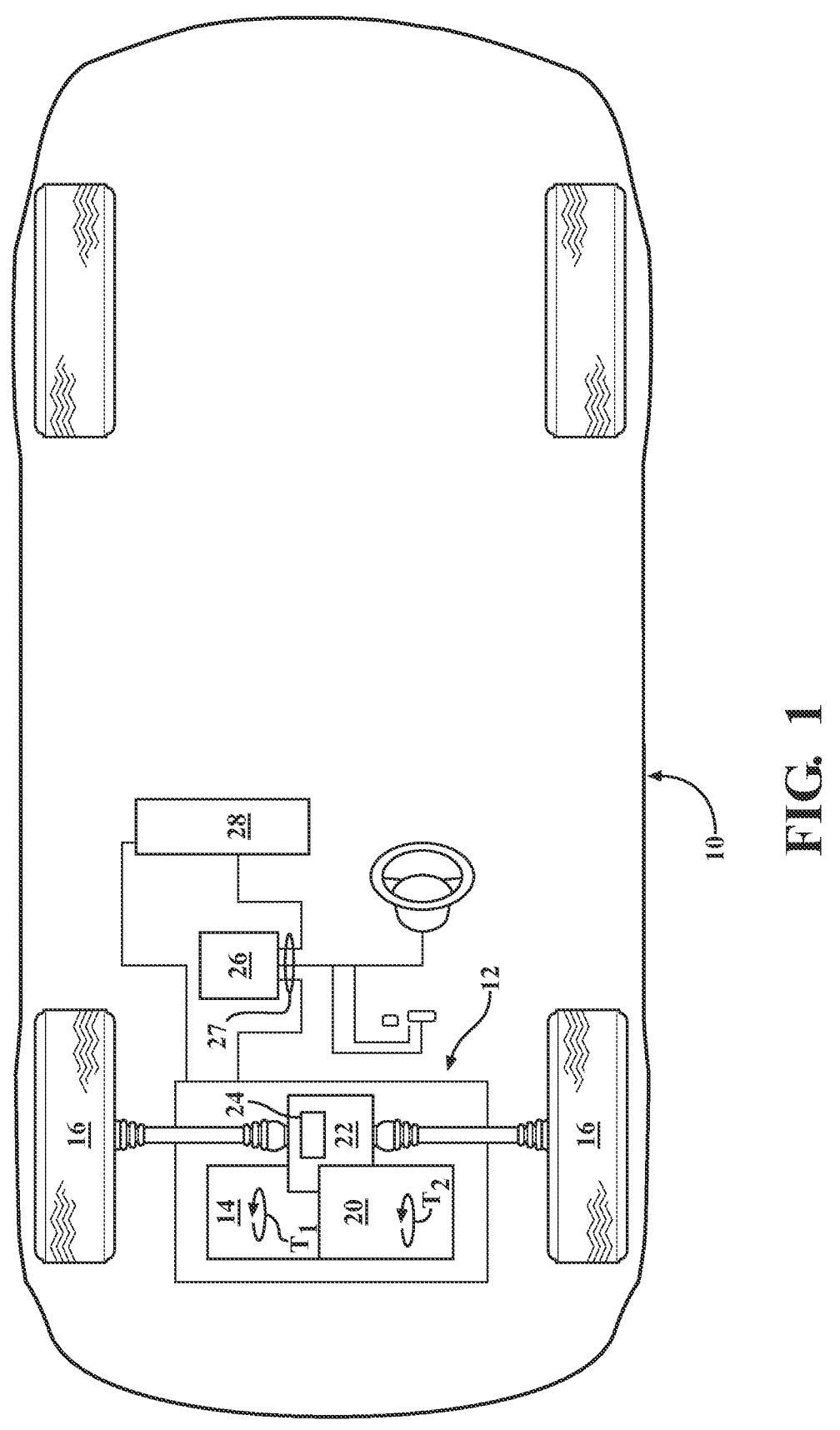
FIG. 1 is a schematic illustration of a motor vehicle having a powertrain employing an electric motor-generator for propulsion.

Embodiments of the present disclosure as described herein are intended to serve as examples. Other embodiments may take various and alternative forms. Additionally, the drawings are generally schematic and not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Certain terminology may be used in the following description for the purpose of reference only, and thus are not intended to be limiting. For example, terms such as "above" and "below" refer to directions in the drawings to which reference is made. Terms such as "front", "back", "fore", "aft", "left", "right", "rear", "side", "upward", "downward", "top", and "bottom", etc., describe the orientation and/or location of portions of the components or elements within a consistent but arbitrary frame of reference, which is made clear by reference to the text and the associated drawings describing the components or elements under discussion.

Furthermore, terms such as "first", "second", "third", and so on may be used to describe separate components. Such terminology may include the words specifically mentioned above, derivatives thereof, and words of similar import, and are used descriptively for the figures, and do not represent limitations on the scope of the disclosure, as defined by the appended claims. Moreover, the teachings may be described herein in terms of functional and/or logical block components and/or various processing steps. It should be realized that such block components may include a number of hardware, software, and/or firmware components configured to perform the specified functions.

Referring to FIG. 1, a motor vehicle 10 having a powertrain 12 is depicted. The motor vehicle 10 may include, but not be limited to, a commercial vehicle, industrial vehicle, passenger vehicle, aircraft, watercraft, train or the like. It is also contemplated that the motor vehicle 10 may be a mobile platform, such as an airplane, all-terrain vehicle (ATV), boat, personal movement apparatus, robot and the like to accomplish the purposes of this disclosure. The powertrain 12 includes a first power-source 14 depicted as an electric motor-generator and configured to generate a first power-source torque $T_1$ (shown in FIG. 1) for propulsion of the motor vehicle 10 via driven wheels 16 relative to a road surface. The motor-generator 14 may be configured as a radial flux electric motor (shown for example in FIGS. 2 and 4), where the magnetic flux is generated perpendicular to the motor's axis of rotation and the airgap between the machine's rotor and stator is arranged concentrically with the rotational axis. Alternatively, the motor-generator 14 may be configured an axial flux electric motor (not shown but understood by those skilled in the art) where the magnetic flux is generated coaxially with the motor's axis of rotation and the airgap between the machine's rotor and stator is arranged perpendicular to the rotational axis. For the purposes of compact disclosure, the remainder of present description will focus primarily on the radial flux construction of the motor-generator 14.

As shown in FIG. 1, the powertrain 12 may also include a second power-source 20, such as an internal combustion engine configured to generate a second power-source torque $T_2$. The power-sources 14 and 20 may act in concert to power the motor vehicle 10 and be operatively connected to a transmission assembly 22. The transmission assembly 22 may be configured to transmit first and/or second power-source torques $T_1$, $T_2$ to a final drive unit 24, which in turn may be connected to the driven wheels 16. The first power-source 14, which for the remainder of the present disclosure will be referred to as a motor-generator or electric motor, may, for example, be mounted to the second power-source 20, mounted to (or incorporated into) the transmission assembly 22, mounted to the final drive unit 24, or be a stand-alone assembly mounted to the structure of the vehicle 10. As shown, the motor vehicle 10 additionally includes a programmable electronic controller 26 configured to communicate via a high-voltage BUS 27 and control the powertrain 12 to generate a predetermined amount of power-source torque (such as the sum of $T_1$ and $T_2$), and various other vehicle systems. Motor vehicle 10 additionally includes an energy storage system 28, such as one or more batteries, configured to generate and store electrical energy for powering the power-sources 14 and 20.

Figure 2:
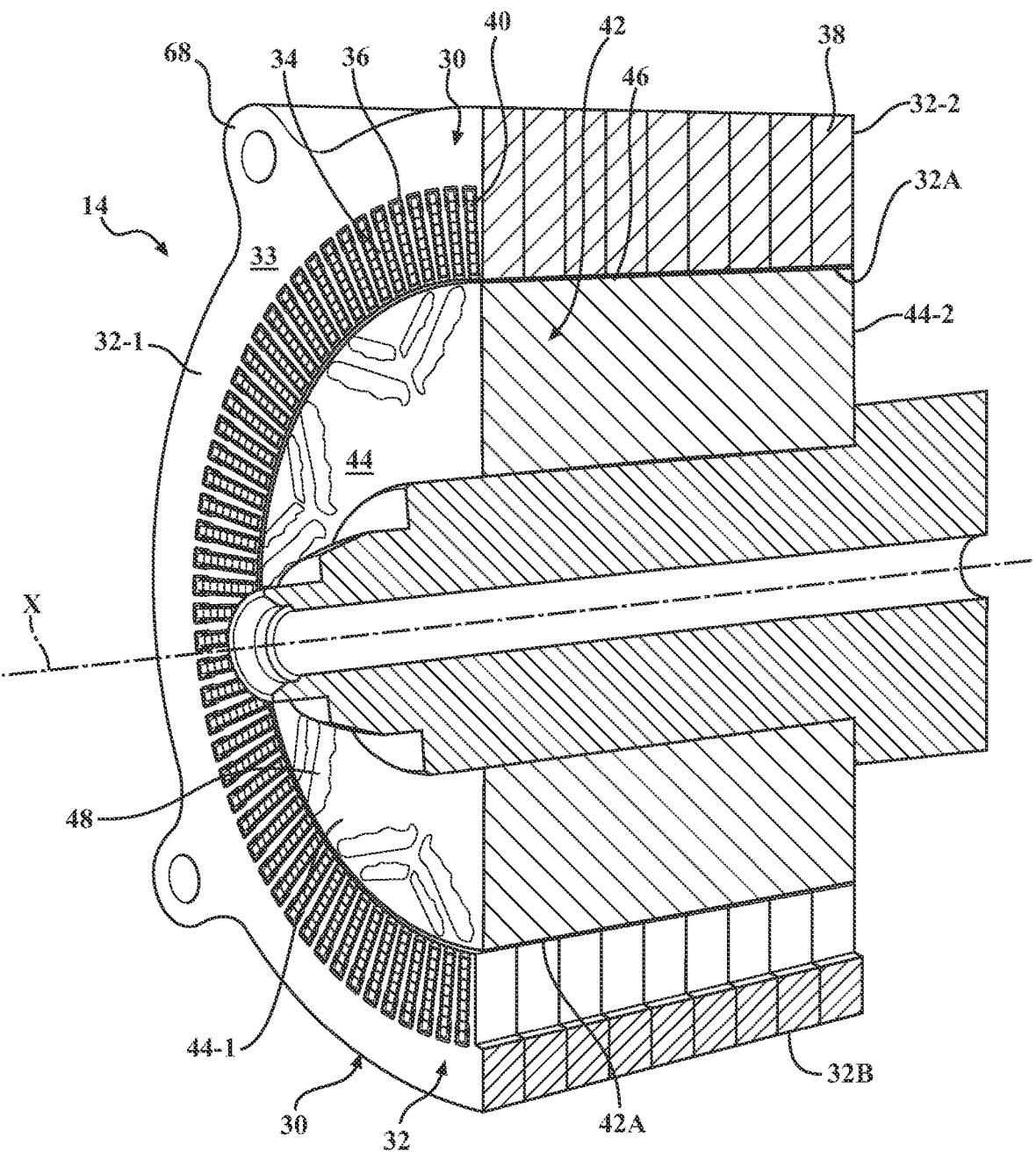
FIG. 2 is a schematic close-up partial cut-away perspective view of a radial flux embodiment of the electric motor-generator shown in FIG. 1, depicting a stator defining stator teeth, and having conductors arranged within conductor slots and slot liners surrounding the conductors, according to the disclosure.

FIG. 2 illustrates a general cross-section of the radial flux embodiment of the motor-generator 14. As shown, the motor-generator 14 includes a rotationally fixed stator assembly or stator 30 having a generally cylindrical stator core 32 defining a stator core body or back iron 33 and a plurality of stator teeth 34 extending therefrom. The stator core 32 is constructed from a ferromagnetic material and has a stator inside diameter (ID) defining a radially inner stator surface 32A and a stator outside diameter (OD) defining a radially outer stator surface 32B, as shown for example in FIG. 2. The stator teeth 34 define multiple conductor slots 36 therebetween. The stator core 32 may include or be constructed from a plurality of adjacent, e.g., bonded, stator laminations 38 arranged along the rotational axis X.

As shown in FIG. 2, the stator 30 also includes multiple conductors or wire windings 40 arranged within the conductor slots 36. Specifically, a plurality of conductors 40 may be arranged within each of the conductor slots 36. Although the stator conductors 40 are generally contained within the conductor slots 36, the end turns of the conductors typically extend beyond the limits of the cylindrical core 32 at axially opposite stator ends—a first end 32-1 and a second end 32-2. The motor-generator 14 also includes at least one rotor 42 arranged on a shaft defining a rotational axis X and thereby mounted for rotation inside the stator 30. Specifically, the axial flux motor-generator 14 may have two rotors 42, each arranged on one side of the stator 30, while the radial flux motor-generator 14 includes a single rotor 42 mounted inside the corresponding stator 30.

The rotor(s) 42 have respective external rotor surface(s) 42A. Each rotor 42 has a ferromagnetic rotor core 44. The rotor core 44 has axially opposite rotor core ends—a first end 44-1 and a second end 44-2. In the case of the radial flux motor-generator 14, the external rotor surface 42A is a radially outer surface, while in the radial flux motor-generator, the external rotor surface 42A is defined by either the first end 44-1 or the second end 44-2. The rotor core 44 may be constructed from a relatively soft magnetic material, such as laminated silicon or ferrous steel. As shown in FIG. 2, in the radial flux motor-generator 14 the rotor core outer surface 44A establishes an airgap 46 between the rotor 42 and the stator 30, i.e., between the external rotor surface 42A and the external stator surface 32A.

Figure 3:
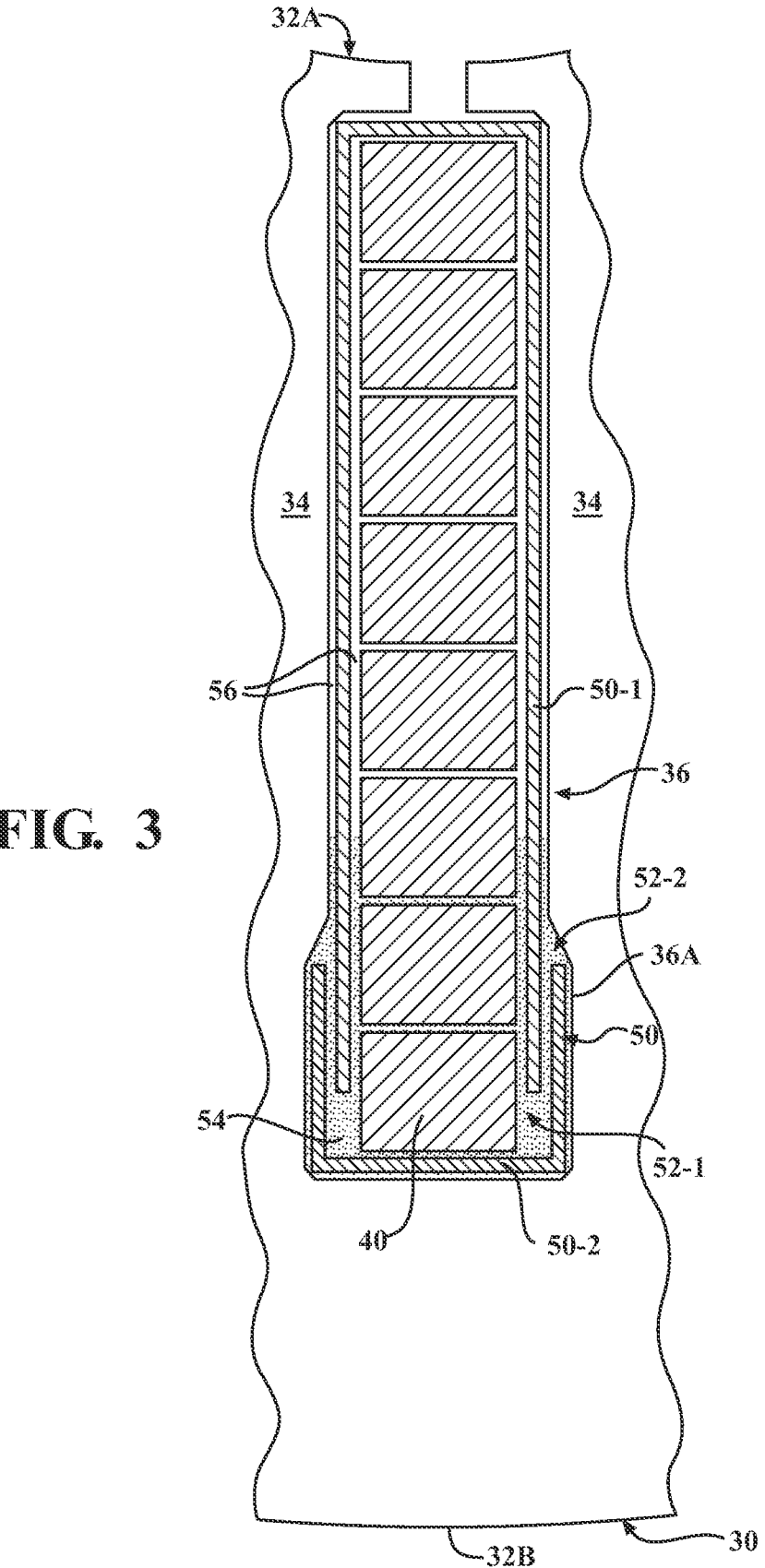
FIG. 3 is a schematic partial plan or front view of an embodiment of the stator shown in FIG. 2, illustrating representative neighboring stator teeth, two-piece slot liners surrounding the conductors, first and second gaps established via the slot liners, and a variable amount of varnish arranged in the gaps, according to the disclosure.

With continued reference to FIG. 2, each rotor 42 includes a plurality of magnetic poles 48, with each pole being configured to generate a magnetic flux. The stator conductors 40 are configured to establish a rotating magnetic field exerting a torque on the rotor(s) 42 via interaction with the rotor's magnetic poles 48. The stator conductors 40 receive multiphase AC from a power inverter to establish a rotating magnetic field exerting torque upon the rotor(s) 42. As shown in FIG. 3, the stator 30 also includes a plurality of slot liners 50, each slot liner being arranged within a respective conductor slot 36 and surrounding the corresponding stator conductors 40. Each slot liner 50 may include a first slot liner section 50-1 and a second slot liner section 50-2. The first slot liner section 50-1 is configured to wrap partially around the corresponding stator conductors 40 arranged within a respective conductor slot 36. The second slot liner section 50-2 is configured to also wrap partially around the same stator conductors 40 and overlap a portion of the first slot liner section 50-1 such that the subject conductors are encased by the two slot liner sections as seen in a stator plan view (shown in FIG. 3). Each of the conductor slots 36 may have an enlarged section 36A to accommodate the overlapping first and second slot liner sections 50-1, 50-2.

As seen in the stator 30 partial plan view (shown in FIG. 3), a first gap 52-1 is established between each stator conductor 40 and the corresponding slot liner 50. A second gap 52-2 is established between each slot liner 50 and the neighboring stator teeth 34, to each side of the subject conductor slot 36. Respective first and second gaps 52-1, 52-2 are thereby arranged entirely within their corresponding conductor slots 36. A predetermined or controlled amount of varnish 54 is arranged within each of the first and second gaps 52-1, 52-2. To establish a requisite amount of varnish 54 within the first and second gaps 52-1, 52-2, the varnish may be applied to specific conductors 40 and into strategically identified areas of the conductor slots 36 via capillary action. Such varnish application may be accomplished following twisting and welding of stator wire windings and prior to curing of the stator assembly 30. Thus arranged, a specific amount of varnish 54 is configured to limit an amount of open space 56, i.e., free from the varnish, within the first and second gaps 52-1, 52-2 to regulate or tune viscous damping, including noise, vibration, and harshness (NVH) characteristics, of the electric motor 14, as will be described in detail below. The amount of varnish 54 may, for example, be varied in a radial direction between the stator ID and the stator OD.

Figure 4:
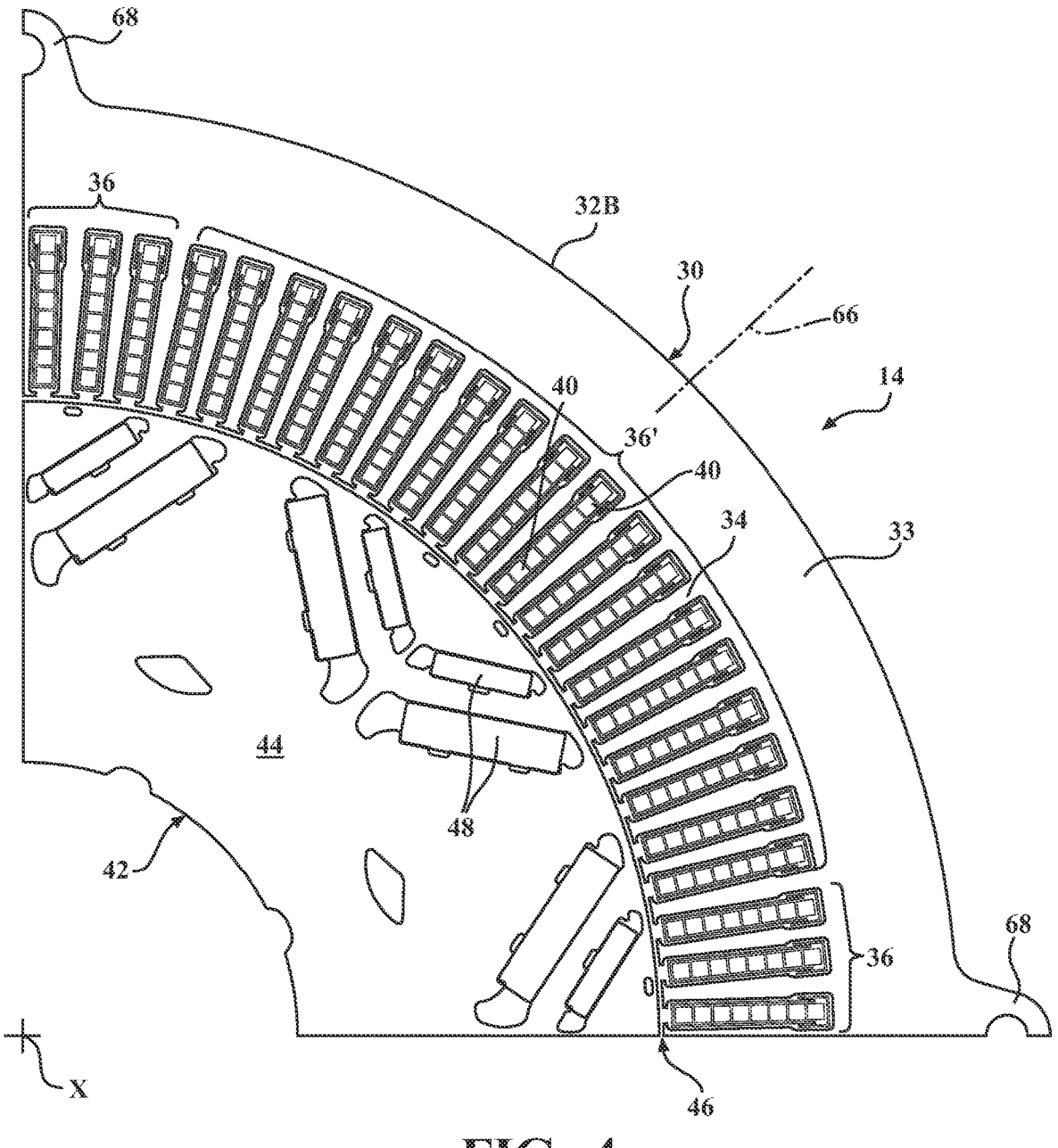
FIG. 4 is a schematic plan or front view of electric motor-generator shown in FIG. 2, illustrating high resonance locations arranged between stator mounting bosses, according to an embodiment of the disclosure.
Figure 5:
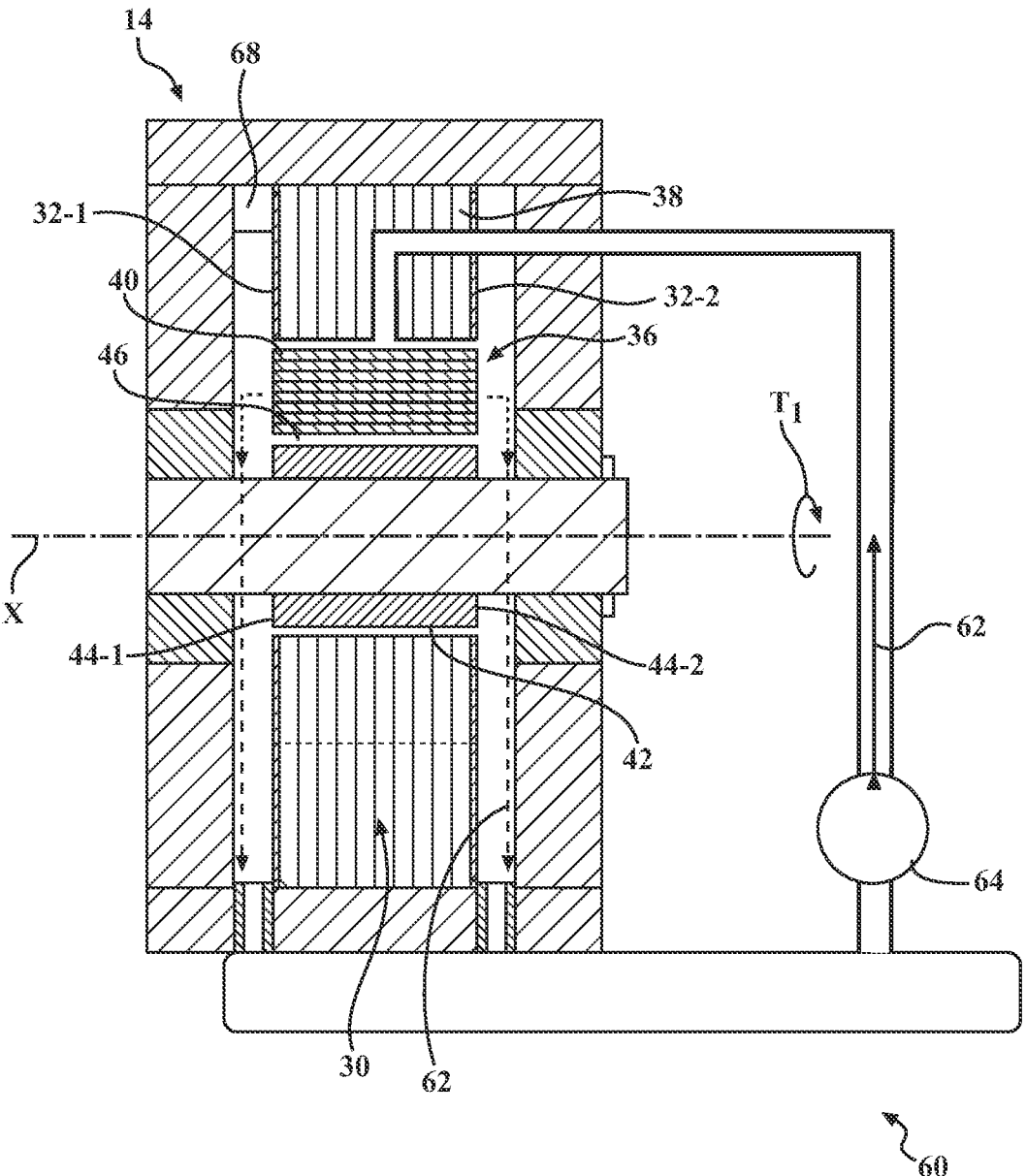
FIG. 5 is a schematic close-up cross-sectional side view of the radial flux motor-generator shown in FIG. 2, depicting a fluid circulation system configured to supply oil to the first and second gaps between the stator teeth, according to the disclosure.

As shown in FIG. 5, the motor-generator 14 may also include a lubrication or fluid circulation system 60 configured to supply oil 62 to the stator 30, such as via a fluid pump 64. During operation of the motor-generator 14, a portion of the oil 62 may fill the open space 56 within the first and second gaps 52-1, 52-2 to thereby affect the electric motor's NVH characteristics. For example, the varnish 54 may fill up to 80% of each of the first and second gaps 52-1, 52-2 of the entire stator 30, leaving the remaining 20% to be filled by the oil 62. With resumed reference to the plan view shown in FIG. 4, the predefined amount of varnish 54 may be applied in slots 36 arranged distal or away from relatively high vibration or resonance angular positions 66 on the stator 30. In such an embodiment, during electric motor 14 operation, the oil 62 would variably fill the open spaces 56 in the remaining slots (identified with numeral 36') bracketing or proximate the relatively high resonance positions 66 to damp out stator vibrations.

The varnish 54 arranged away from the relatively high vibration angular positions 66 may fill greater than 90% and up to 100% of each of the first and second gaps 52-1, 52-2. On the other hand, the varnish 54 arranged proximate the relatively high resonance angular positions 66 may fill approximately 50% of each of the first and second gaps 52-1, 52-2. The amount of varnish 54 may be varied among the adjacent stator laminations 38 axially along the rotational axis X, as seen in a side view, shown in FIG. 5. The variation of varnish 54 amount may be consistent among the multiple stator laminations 38 or be adjusted differently along the rotational axis X according to identified resonance areas of the stator 30.

As shown in FIGS. 2 and 4, the stator core 32 may include a plurality of mounting bosses 68. The mounting bosses 68 may be circumferentially arranged on the radially outer stator surface 32B and clocked in structurally advantageous positions. The mounting bosses 68 define constraint locations of the electric motor 14 relative to the motor vehicle 10 structure. In such an embodiment, the relatively high vibration angular positions 66 may be disposed between the mounting bosses 68 (shown in FIG. 4). Accordingly, the predefined amount of varnish 54 fill may then be arranged within the first and second gaps 52-1, 52-2 between the mounting bosses 68. In the stator side view shown in FIG. 5, the mounting bosses 68 may be arranged on or proximate to the first stator end 32-1. In such an embodiment, the varnish 54 may be concentrated near the first stator end 32-1 and fill greater than 90% of each of the first and second gaps 52-1, 52-2 axially proximate the mounting bosses 68.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An electric motor comprising:

a stator having a stator core constructed from a ferromagnetic material and having an external stator surface;

a lubrication system configured to supply oil to the stator;

wherein:

the stator core includes a stator core body and a plurality of stator teeth extending therefrom; and the plurality of stator teeth define conductor slots therebetween; and wherein:

the stator additionally includes:

a plurality of stator conductors arranged within the conductor slots; and a slot liner arranged within each conductor slot and surrounding the corresponding stator conductors;

a first gap is established between each stator conductor and the corresponding slot liner; and a second gap is established between each slot liner and the neighboring stator teeth;

a predetermined amount of varnish is arranged within each of the first gap and the second gap and thereby configured to limit an amount of open space within the first and second gaps that is free from the varnish and regulate viscous damping of the electric motor; and wherein a portion of the oil fills the open space within the first and second gaps during operation of the electric motor to thereby affect noise, vibration, and harshness (NVH) characteristics of the electric motor.

2. The electric motor according to claim 1, wherein the varnish fills up to 80% of each of the first and second gaps.

3. The electric motor according to claim 1, wherein the varnish is arranged away from relatively high vibration angular positions.

4. The electric motor according to claim 3, wherein the varnish arranged away from the relatively high vibration angular positions fills greater than 90% of each of the first and second gaps.

5. The electric motor according to claim 3, wherein the varnish arranged proximate the relatively high vibration angular positions fills 50% of each of the first and second gaps.

6. The electric motor according to claim 3, wherein the stator core includes a plurality of adjacent stator laminations arranged along the rotational axis, and wherein the amount of varnish is varied along the rotational axis.

7. The electric motor according to claim 3, wherein, in a plan view, the stator core includes a plurality of circumferentially arranged mounting bosses defining electric motor constraint locations, wherein the relatively high vibration angular positions are disposed between the mounting bosses, and wherein the predetermined amount of varnish is applied within the first and second gaps between the mounting bosses.

8. The electric motor according to claim 7, wherein, in a side view, the stator core includes a first stator end and an opposite second stator end, and wherein the mounting bosses are arranged on the first stator end, and wherein the varnish fills greater than 90% of each of the first and second gaps axially proximate the mounting bosses.

9. The electric motor according to claim 1, wherein the stator includes a stator inside diameter (ID) and a stator outside diameter (OD), and wherein the amount of varnish is varied in a radial direction between the stator ID and the stator OD.

10. A motor vehicle comprising:
an electric motor configured to generate torque for propulsion of the motor vehicle, the electric motor including:
a stator having a stator core constructed from a ferromagnetic material and having an external stator surface;
a lubrication system configured to supply oil to the stator;
wherein:
the stator core includes a stator core body and a plurality of stator teeth extending therefrom; and
the plurality of stator teeth define conductor slots therebetween; and
wherein:
the stator additionally includes:
a plurality of stator conductors arranged within the conductor slots; and
a slot liner arranged within each conductor slot and surrounding the corresponding stator conductors;
a first gap is established between each stator conductor and the corresponding slot liner; and
a second gap is established between each slot liner and the neighboring stator teeth;
a predetermined amount of varnish is arranged within each of the first gap and the second gap and thereby configured to limit an amount of open space within the first and second gaps that is free from the varnish and regulate viscous damping of the electric motor; and
wherein a portion of the oil fills the open space within the first and second gaps during operation of the electric motor to thereby affect noise, vibration, and harshness (NVH) characteristics of the electric motor.

11. The motor vehicle according to claim 10, wherein the varnish fills up to 80% of each of the first and second gaps.

12. The motor vehicle according to claim 10, wherein the varnish is arranged away from relatively high vibration angular position.

13. The motor vehicle according to claim 12, wherein the varnish arranged away from the relatively high vibration angular positions fills greater than 90% of each of the first and second gaps.

14. The motor vehicle according to claim 12, wherein the varnish arranged proximate the relatively high vibration angular positions fills 50% of each of the first and second gaps.

15. The motor vehicle according to claim 12, wherein, in a plan view, the stator core includes a plurality of circumferentially arranged mounting bosses defining electric motor constraint locations, wherein the relatively high vibration angular positions are disposed between the mounting bosses, and wherein the predetermined amount of varnish is applied within the first and second gaps between the mounting bosses.

16. The motor vehicle according to claim 15, wherein, in a side view, the stator core includes a first stator end and an opposite second stator end, and wherein the mounting bosses are arranged on the first stator end, and wherein the varnish fills greater than 90% of each of the first and second gaps axially proximate the mounting bosses.

17. The motor vehicle according to claim 10, wherein the stator includes a stator inside diameter (ID) and a stator outside diameter (OD), and wherein the amount of varnish is varied in a radial direction between the stator ID and the stator OD.

18. An electric motor comprising:
a stator having a stator core constructed from a ferromagnetic material and having an external stator surface;
wherein:
the stator core includes:
a stator core body and a plurality of stator teeth extending therefrom; and
in a plan view, a plurality of circumferentially arranged mounting bosses defining electric motor constraint locations; and
the plurality of stator teeth define conductor slots therebetween;
wherein:
the stator additionally includes:
a plurality of stator conductors arranged within the conductor slots; and
a slot liner arranged within each conductor slot and surrounding the corresponding stator conductors;
a first gap is established between each stator conductor and the corresponding slot liner; and
a second gap is established between each slot liner and the neighboring stator teeth; and
a predetermined amount of varnish is arranged within each of the first gap and the second gap away from relatively high vibration angular position and thereby configured to limit an amount of open space within the first and second gaps that is free from the varnish and regulate viscous damping of the electric motor; and wherein:

the relatively high vibration angular positions are disposed between the mounting bosses; and the predetermined amount of varnish is applied within the first and second gaps between the mounting bosses.

\* \* \* \* \*